United States Patent [19]

Sahara et al.

[11] 4,381,889
[45] May 3, 1983

[54] CAMERA DIAPHRAGM APERTURE CONTROL DEVICE

[75] Inventors: Masayoshi Sahara, Sennan; Masaaki Nakai, Nara, both of Japan

[73] Assignee: Minolta Camera Kabushiki Kaisha, Osaka, Japan

[21] Appl. No.: 351,957

[22] Filed: Feb. 24, 1982

[30] Foreign Application Priority Data

Mar. 3, 1981 [JP] Japan .................... 56-30878

[51] Int. Cl.³ .................... G03B 7/085; H01H 47/24; H03K 5/153
[52] U.S. Cl. .......................... 354/41; 354/42; 354/43; 354/202; 361/174; 361/187; 307/360; 328/147
[58] Field of Search ............ 354/29, 30, 28, 36, 354/38, 42-44, 271, 50, 51, 60 R, 202, 234, 235, 41, 37, 270, 195, 25 R, 25 A, 25 P, 25 N; 361/86, 187, 174, 175; 340/660, 661; 328/147; 307/350, 360

[56] References Cited

U.S. PATENT DOCUMENTS 3,868,702 2/1975 Strauss et al. .................... 354/42
4,307,948 12/1981 Kitamura et al. .................... 354/42

FOREIGN PATENT DOCUMENTS 56-4125 1/1981 Japan .

Primary Examiner—William B. Perkey
Attorney, Agent, or Firm—Watson, Cole, Grindle & Watson

[57] ABSTRACT

An electromechanical device such as a camera diaphragm control device includes a compensation means which compensates for a time lag from generation of a stop signal to actual stoppage of a movable member such as a diaphragm or a diaphragm drive member. The amount of compensation is varied in accordance with determination of the amount of the movement of the movable member from an initial end position to a position where the movable member is to be stopped. In the case of automatic diaphragm control, the amount to be determined may be the steps from the full open position to a position corresponding to a diaphragm aperture to be determined.

12 Claims, 2 Drawing Figures

CAMERA DIAPHRAGM APERTURE CONTROL DEVICE

BACKGROUND OF THE INVENTION

1. Field of the Invention

The present invention generally relates to an electromechanically controlled device and more particularly, although not specifically so limited, to an automatic camera diaphragm aperture control device of the type which, while stopping-down the diaphragm of an objective lens, measures the intensity of the light coming from an object to be photographed and having passed through the aperture, and stops the stop-down operation when the light measurement reaches a predetermined relationship with a predetermined value, thereby determining a diaphragm aperture.

2. Description of the Prior Art

There have been marketed cameras equipped with the aforementioned type of diaphragm aperture control device, which employs an electromagnetic or electromechanical mechanism to convert an electric signal into a mechanical motion. For aperture control, the diaphragm of the objective lens is rapidly stopped down from the full aperture towards the minimum aperture, and an electric signal is generated when the aperture reaches a desired value during the stopping-down of the diaphragm. In response to this electric signal, the electromagnetic mechanism is actuated to stop the operation of a diaphragm aperture stopping-down member or a member interlocked therewith thereby determining a diaphragm aperture. In this case, a slight time lag occurs between the generation of the electric signal and the time when the stopping-down member is actually restrained to stop its movement. This requires the aperture stop signal to be generated at a time equal to the time lag before the aperture reaches a desired value so that the aperture may be controlled to the desired value.

However, since the aperture stop-down operation accelerates, the time lag to be estimated should be varied in accordance with the rate of the stopping-down operation to determine the aperture more accurately. Japanese Laid-Open Patent Application No. Tokkai-Sho 56-4125 discloses a diaphragm aperture control device which, to meet such requirements, varies the time interval to be estimated for the generation of an aperture stop signal before the actual arrestment of the diaphragm driving member, on the assumption that the rate of aperture stopping-down is a function of the elapsed time from the start of the stop-down operation. The disclosed device has a circuit constructed such that a light measurement voltage representative of a suitable shutter speed for the measured object brightness, and a voltage signal representative of a preselected shutter speed are applied to a voltage comparator, the output of which is inverted when these two input voltages reach a predetermined relationship, thereby actuating an electromagnetic mechanism. In this circuit, a voltage signal with a value corresponding to each elapsed time is generated at a plurality of predetermined elapsed time points from the aperture stop-down operation. The voltage of the last signal in each time interval between the elapsed time points is added, for example, to the voltage signal representative of the predetermined shutter speed, so that the output of the voltage comparator may be inverted earlier by the time corresponding to the added voltage.

As is generally known, a wide variety of exchangeable lenses are available to a single-lens reflex camera. The device disclosed in the No. Tokkai-Sho 56-4125, if made effective for such exchangeable lenses, requires the aperture stop-down characteristics of each of the exchangeable lenses to be the same. In an actual exchangeable lens system, however, the amount of stopping-down from the full aperture with the displacement of a lens aperture stop-down lever which is driven by the diaphragm drive member of a camera body, often varies with the type of lens. Consequently, the device is not applicable to the camera including such exchangeable lens systems.

SUMMARY OF THE INVENTION

Accordingly, the general object of the present invention is to provide an electromechanically controlled device for a camera wherein compensation is made for a time lag between the generation of a stop signal and the actual stoppage of a mechanical member, with changes in the moving speed of the movable member being taken into account.

Another object of the present invention is to provide a diaphragm aperture control device which is equipped with means for compensating for the delay of the operation of an electromagnetic mechanism and which functions even if the relationship between the displacement of a lens aperture stop-down lever and the amount of stopping-down of the diaphragm varies with different exchangeable lenses.

The aperture control device according to the present invention is constructed such that the anticipated amount of diaphragm stopping-down movement is detected immediately before the initiation of the diaphragm stopping-down operation to determine the amount of compensation for the delay as a function of the detected amount. When the difference between the two input voltages of a comparator, i.e., the voltage corresponding to the light intensity measured through the diaphragm aperture being stopped-down and a predetermined voltage, reaches the value corresponding to the determined amount of compensation, the output of the voltage comparator inverts to actuate the electromagnetic mechanism and determine a diaphragm aperture.

According to the present invention, the measurement of elapsed time from the start of the aperture stopping-down operation is not needed, whereby it is irrelevant if the amount of the displacement of the aperture stopping-down lever from its starting point at the time when the diaphragm stopping-down operation is actually initiated varies with the type of exchangeable lens.

BRIEF DESCRIPTION OF THE DRAWINGS

The above and other objects, features and advantages of the invention are easily apparent from a consideration of the following description of the preferred embodiments of the best mode of carrying out the invention when taken in connection with the accompanying drawings wherein.

DETAILED DESCRIPTION OF THE PREFERRED EMBODIMENTS

Figure 1:
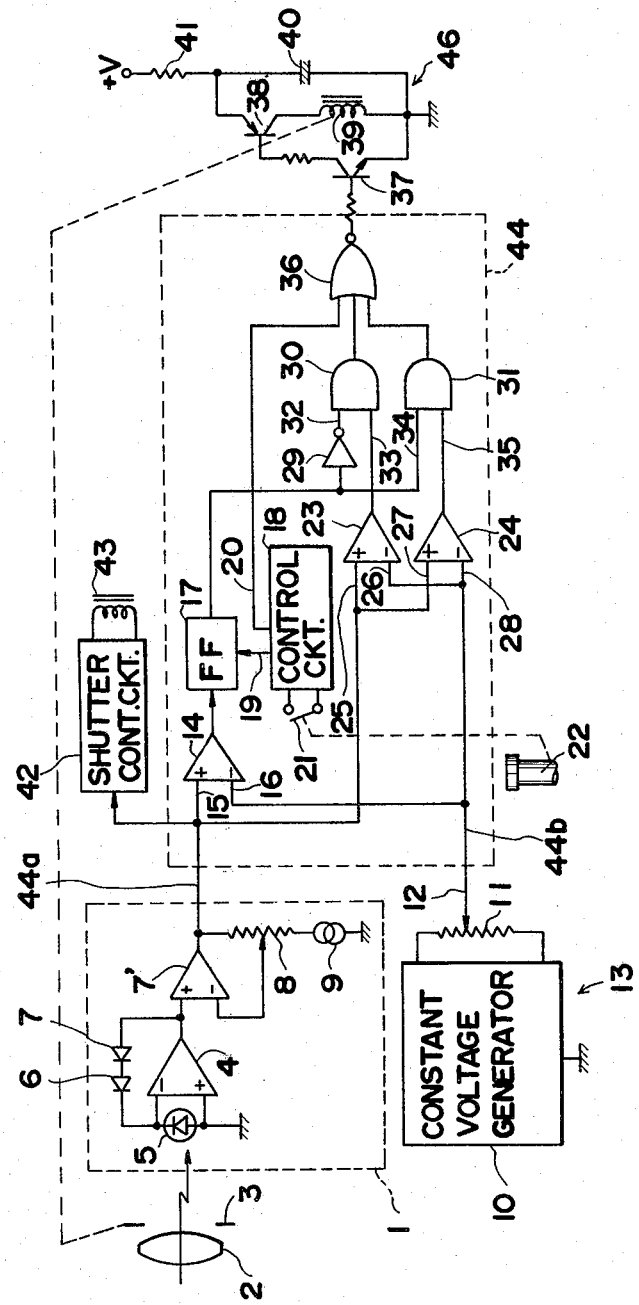
FIG. 1 is a circuit diagram of the first embodiment of the present invention.

The embodiment shown in FIG. 1 is adapted for a lens-exchangeable camera with a shutter-speed priority automatic exposure control system which measures object brightness having passed through a camera objective lens and automatically determines a diaphragm aperture in accordance with the light measurement. For aperture control, the circuit first detects whether or not the number of anticipated steps for stopping-down exceeds one step corresponding to 1 EV in the APEX unit. In the case of the anticipated steps being less than one step, a comparison circuit generates an electric signal for the interruption of the aperture stopping-down when the difference between a voltage as a function of the light measurement and a voltage corresponding to a preselected shutter speed value reaches a voltage corresponding to, for example 0.2 of a step. In the case when the anticipated steps exceeds one step, the comparison circuit generates an electric signal when the difference between the two voltages reaches a voltage corresponding to, for example, 0.6 of a step.

For generating an electric signal when the difference between the two voltage signals reaches a predetermined value, a circuit such as shown in the above-mentioned No. Tokkai-Sho 56-4125 may be used which employs a voltage comparator having zero offset voltage and in which a predetermined voltage is added to one of the two voltage signals being compared so that the voltage sum will be one of the input signals of the voltage comparators. In the circuit of FIG. 1, a comparison circuit, to accomplish the same effect, includes two voltage comparators respectively having exemplary offset voltages corresponding to 0.2 of a step and 0.6 of a step, and arranged such that either of the outputs of the voltage comparators may be selected depending upon the anticipated number of steps of stopping-down.

With reference to FIG. 1, the block 1 enclosed by a dotted line is a conventional light measuring circuit wherein photodiode 5 is connected between a pair of inputs of operational amplifier 4, and diodes 6 and 7 are serially connected in the feedback circuit from the output to one of the inputs of operational amplifier 4 to form a photoelectric converter which generates at the output of the amplifier a voltage signal proportional to the logarithm of the intensity of the light received by photodiode 5 through objective lens (logarithmic compression). The output of the photoelectric converter is connected with one of the inputs of operational amplifier 7', with the other input of the amplifier being connected with a slider of potentiometer 8. Constant current source 9 supplies constant current to potentiometer 8. The slider of potentiometer 8 is slidable in accordance with the film speed setting. Thus, operational amplifier 7', potentiometer 8 and constant current source 9 form an exposure calculation circuit which generates at terminal 44a a voltage as the sum of the voltage from the output of operational amplifier 4 and a voltage commensurate with the set film speed. As photodiode 5 measures object light through the diaphragm aperture, the voltage at terminal 44a, i.e., the output voltage of light measuring circuit 1 corresponds to, or represents, an exposure time suitable for the measured object brightness, the actual diaphragm aperture and the set film speed.

Constant voltage generator 10 is coupled with potentiometer 11 to form manual shutter speed signal generator 13, which produces a voltage signal corresponding to a manually set shutter speed from slider 12 of potentiometer 11.

Voltage comparator 14 includes an operational amplifier having a predetermined offset voltage and functions as a circuit to detect the anticipated number of steps of stopping-down. Non-inversion input terminal 15 of voltage comparator 14 is connected to the output terminal of light measuring circuit 1, and inversion input terminal 16 is connected to output terminal 44b of manual shutter speed signal generator 13. The voltage signal at the terminal 44b serves as a reference signal.

The offset voltage of the operational amplifier of comparator 14 corresponds to one step (1 EV) and is 36 mV at a temperature of 25° C. The reason why the voltage per step corresponds to 36 mV is that light measuring circuit 1 uses two serially connected diodes 6 and 7 for the logarithmic compression of the photoelectric current. Voltage comparator 14 generates a "high" level voltage when the input voltage level at non-inversion input terminal 15 is higher than 36 mV plus the voltage at inversion input terminal 16, and provides a "low" voltage when the input terminal 15 voltage is lower than 36 mV plus the voltage at the inversion terminal. To provide a 36 mV offset voltage, the ratio of the areas of the emitters of two input transistors in comparator 14 having respective bases respectively connected to the non-inversion and inversion input terminals should be made 1:4. This structure enables the equilibrium of voltage comparator 14 to be reached when the voltage level at non-inversion input terminal 15 is higher by 36 mV than the voltage at inversion input terminal 16. The output of voltage comparator 14 is applied to latch circuit 17 and is stored therein in response to a control signal generated by control circuit 18 immediately before the diaphragm aperture is about to be stopped down. With switch 21 closed in response to the release operation of shutter button 22, control circuit 18 generates signals in the sequence required for the sequence control of the circuit. The circuit diagram of FIG. 1 shows only the control terminals related to the present invention.

Voltage comparators 23 and 24, which receive as input signals the output signals of light measuring circuit 1 and manual shutter speed signal generator 13, are designed to have offset voltages of 6.4 mV and 19.2 mV, respectively, corresponding to 0.2 and 0.6 of a step. The offset voltage-providing mechanism for those comparators is similar to that used in voltage comparator 14. In voltage comparator 23, the ratio of areas of the emitters of two input transistors having respective bases connected to non-inversion input terminal 25 and inversion input terminal 26 is 1:1.32 in order to provide a 6.4 mV offset voltage, and in voltage comparator 24, the area ratio is 1:2.38 in order to provide a 19.2 mV offset voltage.

AND gates 30 and 31, and NOT circuit 29 together form a signal selection circuit which selects the outputs of voltage comparators 23 and 24 in response to the output of latch circuit 17. When the output of latch circuit 17 is a "low" level voltage, NOT circuit 29 provides a "high" level voltage to input terminal 32 of AND gate 30, which allows the output signal of voltage comparator 23 to pass. When the output of latch circuit 17 is a "high" level voltage, AND gate 31 passes the output signal of voltage comparator 24. The inputs of NOR gate 36 receive the output signals of AND gates 30 and 31 and control circuit 18, and generates a "high"

level voltage only when these three input signals are all at "low" levels. Control circuit 18 inverts the output voltage at output terminal 20 from a "high" to a "low" level when latch circuit 17 latches the output of voltage comparator 14. While control circuit 18 is generating a "high" level voltage from output terminal 20, NOR gate 36 produces a "low" level voltage independently of the outputs of AND gates 30 and 31. During this period, therefore, transistor 37 remains off. After the voltage at output terminal 20 has been inverted to a "low" level, the output voltage of NOR gate 36 becomes "high" to turn on transistor 37 when the output voltages of AND gates 30 and 31 are all at a "low" level.

A circuit 46 including transistors 37 and 38, electromagnet 39, capacitor 40 and resistor 41, is a conventional diaphragm restraining device which restrains the driving member for diaphragm 3. Electromagnet 39 includes a permanent magnet as a part of the core to attract and hold an armature member, which is interlocked with a diaphragm restraining claw, thereto against the action of a spring by the force of the permanent magnet before the diaphragm is restrained. When transistor 38 is turned on, capacitor 40 is discharged through the coil of electromagnet 39, and this discharge current counteracts the attraction force of the permanent magnet acting on the armature member, which is then released from the electromagnetic core to actuate the diaphragm restraining claw and stop the diaphragm. Transistor 38 turns on instantly when the output voltage of voltage comparator 23 changes from a "high" to a "low" level. However, a time lag occurs during which diaphragm 3 is slightly stopped down further, before the armature member is released from the electromagnetic core and the diaphragm stop-down member is arrested by the diaphragm restraining claw after transistor 38 has turned on.

Exposure time control circuit 42 provides an exposure time corresponding to the output signal of light measuring circuit 1 as a function of the light coming from an object and passing through the diaphragm aperture determined as explained above. The exposure time control circuit to be used here may be either the type which stores the output signal of light measuring circuit 1 to provide an exposure time based on the stored value or the type which measures the light reflected from the leading shutter curtain and the film surface under exposure.

The operation of the above discussed circuit is now described. Assume that the circuit is ready for photography with the camera aimed at a desired object and the shutter speed being manually set to, for example, 1/125 second. Also assume that, when diaphragm 3 is fully open, the output voltage of light measuring circuit 1 corresponds to a shutter speed of 1/1000 second which is three steps higher than the voltage corresponding to the manually selected shutter speed of 1/125 second. In this case, the anticipated number of steps of diaphragm stopping-down is 3, so that voltage comparator 14 generates a "high" level voltage. With shutter button 22 depressed to close switch 21 for photography, a "high" voltage pulse is generated for one millisecond from output terminal 19 of control circuit 18. In response to the pulse, the output signal of voltage comparator 14 is stored in latch circuit 17. A diaphragm stop-down mechanism (not shown) is actuated simultaneously with the generation of the pulse to start the drive of a diaphragm stop-down lever, and at the same time, the output voltage of output terminal 20 is inverted from a "high" to a "low" level. At this time, as voltage comparators 23 and 24 initially generate "high" level voltages, but latch circuit 17 generates a "high" level voltage, the output of voltage comparator 24 is transmitted through AND gate 31 to NOR gate 36.

As diaphragm 3 is stopped down, the output voltage of light measuring circuit 1 decreases. In the embodiment of FIG. 1, the amount of the compensation for the delay of diaphragm stoppage differs by a slow and fast aperture-stop-down speed range under the assumption that the aperture stop-down speed is slower with diaphragm 3 stopped down by one step from the full aperture and the speed increases with the diaphragm being stopped-down beyond one step. When the output voltage of light measuring circuit 1 which decreases with the diaphgram aperture being stopped-down, reaches a level which is 0.6 of a step higher than a voltage corresponding to a manually set shutter speed, the output voltage of voltage comparator 24 is inverted from a "high" to a "low" level to actuate electromagnet 39. Thus, the stop-down operation of diaphragm 3 is restrained after the lapse of a short time from the inversion of the output from voltage comparator 24. As described earlier, the inversion of comparator 24, i.e. generation of a diaphragm stoppage signal is brought about earlier in view of the delay in the operation of the diaphragm restraining mechanism, whereby the diaphragm aperture is determined to a value substantially corresponding to a desired value. The exposure time is then controlled in response to the object light passing through the determined aperture.

When the anticipated steps of stopping-down are less than one step, a "low" level voltage is generated from voltage comparator 14, and a "high" level voltage is applied to input terminal 32 of AND gate 30. Consequently, the output signal of voltage comparator 23 is selected in this case. Upon stopping-down of the diaphragm, the diaphragm restraining mechanism is actuated to determine the diaphragm aperture when the difference between the output signal of light measuring circuit 1 and a voltage signal corresponding to a manually set shutter speed reaches a value corresponding to 0.2 of a step.

In the embodiment described above, the anticipated steps of diaphragm stopping-down are discriminated with respect to two ranges thereof by voltage comparator 14 which has an offset voltage corresponding to one step to detect whether the anticipated steps are over or under one step. However, the present invention is not restricted to this specific number of ranges but may include further voltage comparators which receive as inputs to compare the output signal of light measuring circuit 1 and a manually set shutter speed signal for more detailed detection of the anticipated number of stopping-down steps. In this case, voltage comparators having offset voltages different from those of comparators 23 and 24 should be provided in addition to the latter comparators such that one of the comparators 23 and 24 and additional ones may be selected in accordance with the amount of the output signal of the light measuring circuit and the voltage commensurate with a manually set shutter speed.

Furthermore, in place of the manual shutter speed signal, a program control signal may be used which is produced for a programmed exposure control, in accordance with the output signal from the light measuring circuit. The circuits for producing the program control signal are shown in U.S. Pat. Nos. 4,174,160 and 4,213,682.

Figure 2:
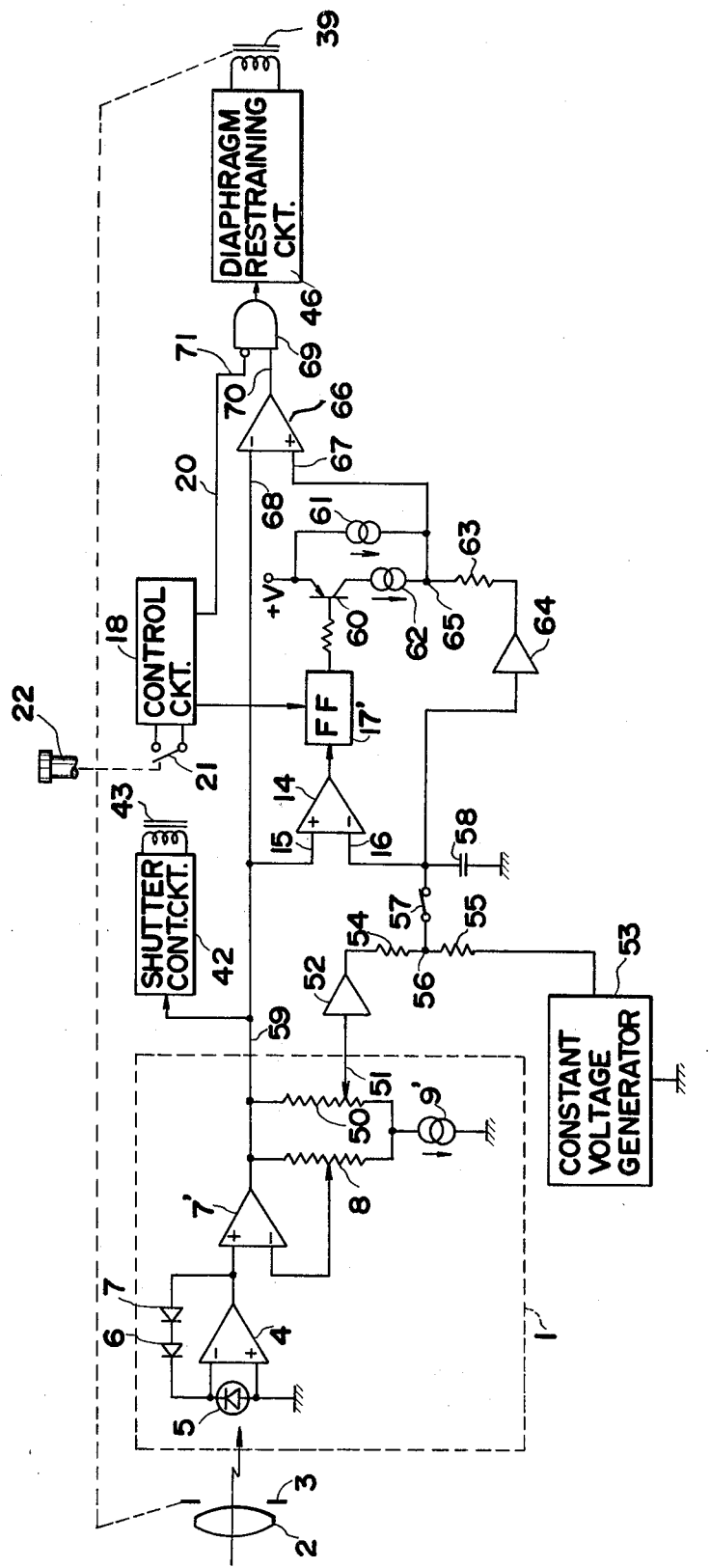
FIG. 2 is a circuit diagram of the second embodiment of the present invention.

FIG. 2 shows another embodiment of the present invention adapted for the same type of camera as the embodiment of FIG. 1, but wherein the reference signal is a program control signal and two different voltages are selectively added to the program control signal before it is applied to an input of a single comparator in place of the selection of a pair of comparators 23 and 24 in the FIG. 1 circuit.

More specifically, with reference to FIG. 2 wherein the same reference numerals are used for the same elements as those of FIG. 1, a photoelectric converter including photodiode 5, series diodes 6 and 7, and operational amplifier 4, generate a voltage signal proportional to the logarithm of the intensity of light received by photodiode 5 through camera objective 2 and the aperture of diaphragm 3. Operational amplifier 7' and potentiometer 8 add to the voltage signal an additional voltage commensurate with a set film speed so that the voltage at the output of amplifier 7' represents a shutter speed suitable for the measured light intensity, the set film speed and the diaphragm aperture through which the light is measured. The diaphragm aperture is fully open at the initial stage of operation.

Potentiometer 50 is fed with a constant current by constant current generator 9' which is also connected with potentiometer 8. Slider 51 of potentiometer 50 is slidable in accordance with diaphragm aperture value or F-stop number presetting as is well known per se such that at the slider is generated a voltage lower than that at the output of amplifier 7' by a voltage corresponding to the steps of diaphragm stopping down from the full open position to the position commensurate with the set diaphragm aperture value. In other words, the voltage at slider 51 corresponds to a shutter speed suitable for the measured light intensity, the set film speed and the preset diaphragm aperture value when the light is measured through the full open diaphragm aperture.

The voltage at slider 51 is applied through buffer circuit 52 to one end of a voltage divider which in turn includes series connected resistors 54 and 55. The other end of the voltage divider is connected to the output of constant voltage generator 53 which generates a constant voltage corresponding to the highest shutter speed available with the camera, for example 1/1000 second. Thus, at the node 56 between resistors 54 and 55 is generated the sum of the voltage at the output of buffer 52 and a fraction of the voltage across the voltage divider. The ratio of the fraction to the whole voltage across series resistors 54 and 55 depends on the resistances thereof. If the resistances are equal to each other, the voltage at the node is the voltage at the output of buffer 52 plus half the voltage difference across the voltage divider. The voltage at node 56 is utilized as a program control signal, which in turn is applied to storage capacitor 58 through storage switch 57. Switch 57 is opened just before the commencement of diaphragm stop-down operation to store the voltage at node 56 at that moment in storage capacitor 58.

Comparator 14, flip-flop 17' and control circuit 18 function in the same manner as in FIG. 1 but flip-flop 17' generates inverted outputs. It is noted that to the inverting input terminal 16 of comparator 14 is applied the stored voltage in place of the voltage corresponding to a manually set shutter speed of FIG. 1. Further, it will be easily appreciated that the circuit may be modified so as to connect the inverting input terminal 16 selectively to the storage capacitor 58 for programmed exposure control and to the slider 12 of FIG. 1 for manual shutter speed control. The stored voltage in storage capacitor 58 is also applied through buffer circuit 64 and voltage adding circuit 60 to 63 to non-inverting input terminal 67 of voltage comparator 66. Inverting input terminal 68 of comparator 66 is connected to the output of light measuring circuit 1 through line 59. The offset voltage of comparator 66 may be zero.

With reference to the voltage adding circuit, a pair of constant current generators 61 and 62 are parallelly connected with resistor 63 while transistor 60 is connected in series with constant current generator 62. The emitter of transistor 60 and the other end of constant current source 61 is connected to a voltage source +V. The base of transistor 60 is connected to the flip-flop 17' so that when the output of flip-flop 17' is a low level, transistor 60 is rendered conductive to cause current supply from both constant current source 61 and 62 to resistor 63. Thus, a larger voltage across resistor 63 is added to the stored voltage before it is applied to input terminal 67 of comparator 66. When the output of flip-flop 17' is at a high level, transistor 60 remains non-conductive so that only the current of constant current source 61 is fed to resistor 63 whereby a smaller voltage is added to the stored voltage. The voltage across resistor 63 may, for example, correspond to 0.6 of a step when current is supplied from both current sources 61 and 62, and correspond to 0.2 of a step when current is supplied from only current source 61.

The output of comparator 66 is connected through line 70 to an input of AND gate 69, the inverted input thereof being connected to control circuit 18. The output of AND gate 69 is connected to diaphragm restraining circuit 46 which has the same structure as the diaphragm restraining device 46 in FIG. 1. In response to a high level signal from AND gate 69, diaphragm restraining circuit 46 energizes the coil of electromagnet 39 to actuate a diaphragm arresting member (not shown) and stop the diaphragm stopping-down operation. Shutter control circuit 42 is connected to line 59 and is actuated upon initiation of shutter opening operation which is effected after the determination of a diaphragm aperture. Thus, shutter control circuit 42 receives the output of light measuring circuit 1 while it measures the object light through a determined diaphragm aperture.

With the above construction, at the initial stage of operation, the diaphragm aperture is fully open, switch 21 is open and switch 57 is closed. Thus, comparator 14 compares the output voltage of light measuring circuit 1 which represents a shutter speed suitable for the fully open diaphragm aperture, and the voltage from the node 56 which represents a shutter speed to be controlled. Hence, the voltage difference between the inputs 15 and 16 of comparator 14 represents steps of diaphragm stopping down from the full open position to an aperture position designated by the program control signal. If the voltage difference is larger than the voltage corresponding to one step, the output of comparator 14 is a high level. When switch 21 is closed in response to a shutter release operation, control circuit 18 applies a pulse signal to flip-flop 17' which in turn generates a low level signal from its output to make transistor 60 conductive. At the same time, the voltage at terminal 20 is inverted to a low level. When diaphragm 3 is actuated, comparator 66 compares the output voltage of light measuring circuit 1 which measures an object light through the diaphragm aperture being stopped-down, with the sum of the voltage stored in storage capacitor 58 and the voltage across resistor 63 to which current is supplied from both constant current sources 61 and 62 due to the conductivity of transistor 60. When the voltage at terminal 68 reaches the voltage at terminal 67, i.e., when the voltage difference between the voltage stored in storage capacitor 58 and the output voltage of light measuring circuit 1 reaches the voltage across resistor 63, e.g., corresponding to 0.6 of a step, comparator 66 inverts its output to a high level. As the voltage at terminal 20 has been a low level to open AND gate 69, the high level output from comparator 66 is fed to diaphragm restraining circuit 46 to actuate electromagnet 39 and stop diaphragm 3.

When the voltage difference between terminals 15 and 16 is not larger than the voltage corresponding to one step, at the first stage of operation, comparator 14 generates a low level output, and flip-flop 17' generates a high level signal to block transistor 60 so that only the current source 61 supplies current to resistor 63. In this case, comparator 66 inverts its output voltage to a high level when the difference between the output voltage of light measuring circuit 1 and the voltage stored in storage capacitor 58 reaches the smaller voltage across resistor 63, e.g., corresponding to 0.2 of a step.

Although the present invention has been described with respect to two embodiments which are adapted for diaphragm control devices of the type wherein light from an object to be photographed is measured through the diaphragm aperture being stopped-down, the application of the invention is not limited to such application but may be extended to other types of exposure control systems and even to automatic focusing systems insofar as they include a movable member which is to be arrested by an electromechanical device in response to an electric signal with a time lag occurring between the generation of the electric signal and the actual stoppage of the movable member.

It is to be understood that the forms of our invention herein shown and described are to be taken as preferred examples of the same and that various changes in the elements, circuit portions and arrangement may be resorted to without departing from the spirit of our invention or the scope of the subjoined claims.

What is claimed is:

1. A camera exposure control device comprising:
    a diaphragm member movable from an initial end position towards a terminal position to change diaphragm aperture;
    light measuring means for measuring, through the diaphragm aperture, light from an object to be photographed and generating a first signal as a function of the measured light, said first signal changing with the change of said diaphragm aperture;
    reference means for generating a reference signal;
    comparison means for comparing said first signal with said reference signal and generating a stop signal when the difference between said first and reference signals reaches a selected one of a plurality of given values;
    electromagnetic stop means responsive to said stop signal for stopping the movement of said diaphragm member to determine the aperture thereof;
    means for determining, before the actuation of said diaphragm member, the amount of movement of said diaphragm member from said initial end position to a position where it is to be stopped by said stop means, and generating a control signal in accordance with the determined amount; and
    selection means responsive to said control signal for selecting the one of said given values at which the stop signal is generated.

2. A camera exposure control device as claimed in claim 1 wherein said light measuring means includes a photo-electric converter for generating a second signal commensurate with the intensity of the measured light, means for generating a third signal commensurate with a set film speed and an exposure calculation means for making an exposure calculation with said second and third signals and generating, as said first signal, a first exposure signal representative of a shutter speed suitable for the measured light intensity, the set film speed and the diaphragm aperture through which the light is measured, and said reference means generates, as said reference signal, a second exposure signal representative of a shutter speed desired to be actually brought about.

3. A camera exposure control device as claimed in claim 2 wherein said reference means includes means for generating, as said second exposure signal, a signal commensurate with a manually set shutter speed.

4. A camera exposure control device as claimed in claim 2 wherein said reference means includes means coupled with said photoelectric converter for generating, as said second exposure signal, a signal corresponding to a shutter speed given as a function of the measured light intensity in accordance with a predetermined program.

5. A camera exposure control device as claimed in claim 2 wherein said determining means includes a first comparator coupled with said light measuring means and said reference means for detecting whether the difference between said first and second exposure signals is larger or not than a predetermined value, said comparison means includes a second comparator for generating the stop signal when the difference between said first and second exposure signals reaches a first predetermined value, and a third comparator for generating the stop signal when the difference between said first and second exposure signals reaches a second predetermined value, and said selection means selects one of said second and third comparators in response to the control signal from said determining means.

6. A camera exposure control device as claimed in claim 5 wherein said first, second and third comparator have respective offset voltages for the difference detections.

7. A camera exposure control device as claimed in claim 2 wherein said comparison means includes means for adding one of a plurality of given voltages to one of said first and second exposure signals and generating a fourth signal as the sum thereof, and a comparator for comparing said fourth signal with the other of said first and second exposure signals, said selection means is coupled with said means for adding to select one of the voltages in accordance with said control signal.

8. A control device for a photographic camera comprising:
    a movable member movable from an initial end position towards a terminal position;

a signal means for generating a variable signal which varies with the movement of said movable member;

a reference means for generating a reference signal;

comparison means for comparing said variable and reference signals and generating a stop signal when the difference between the signals reaches a selected one of a plurality of given values;

electromechanical means for stopping the movement of said movable member in response to said stop signal;

means for determining, before the actuation of said movable member, the amount of movement of said movable member from said initial end portion to a position where it is to be stopped by said electromagnetic means, and generating a control signal in accordance with the determined amount; and selection means responsive to the control signal for selecting the one of said given value at which the stop signal is generated.

9. A control device for a photographic camera as claimed in claim 8 wherein said determining means includes a comparator for comparing with said reference signal the variable signal at the time before said movable member is actuated.

10. A control device for a photographic camera as claimed in claim 9 wherein said comparison means includes a plurality of comparators respectively coupled with said signal means and said reference means and arranged to generate the stop signal when the difference between said variable and reference signals reaches values that are different from each other, and said selection means is coupled with said determining means to select one of the comparators in accordance with the control signal.

11. A control device for a photographic camera as claimed in claim 10 wherein the comparators of said comparison means have given offset voltages that are different from each other.

12. A control device for a photographic camera as claimed in claim 8 wherein said comparison means includes means for adding one of a plurality of given amounts of an electric parameter to one of said variable and reference signals and generating a sum signal as a result of the addition, and a comparator for comparing the sum signal with the other of said variable and reference signals.

* * * * *